EXTENSIBLE PAPER PRODUCT AND PROCESS

Original Filed June 29, 1959 5 Sheets-Sheet 1

INVENTOR.
RUSSELL W. HAMILTON.
BY
Ward, Neal, Haselton, Orme & McElhannon
ATTORNEYS.

EXTENSIBLE PAPER PRODUCT AND PROCESS

Original Filed June 29, 1959 5 Sheets-Sheet 2

INVENTOR.
RUSSELL W. HAMILTON.
BY
Ward, Neal, Haselton, Orme & McElhannon
ATTORNEYS.

EXTENSIBLE PAPER PRODUCT AND PROCESS

Original Filed June 29, 1959 5 Sheets-Sheet 3

INVENTOR.
BY RUSSELL W. HAMILTON.

Arad Neal Haselton Orme & McElhannon
ATTORNEYS.

EXTENSIBLE PAPER PRODUCT AND PROCESS

Original Filed June 29, 1959 5 Sheets-Sheet 4

INVENTOR.
RUSSELL W. HAMILTON.
BY
Ward, Neal, Haselton, Orme & McElhannon
ATTORNEYS.

EXTENSIBLE PAPER PRODUCT AND PROCESS

Original Filed June 29, 1959 5 Sheets-Sheet 5

INVENTOR.
RUSSELL W. HAMILTON.
BY
Ward, Neal, Haselton, Ormond & McElhannon.
ATTORNEYS.

United States Patent Office

Re. 25,335
Reissued Feb. 19, 1963

25,335

EXTENSIBLE PAPER PRODUCT AND PROCESS

Russell W. Hamilton, East Pepperell, Mass., assignor to St. Regis Paper Company, New York, N.Y., a corporation of New York Original No. 2,996,425, dated Aug. 15, 1961, Ser. No. 823,751, June 29, 1959. Application for reissue June 28, 1962, Ser. No. 207,453
12 Claims. (Cl. 162—113)

Matter enclosed in heavy brackets [ ] appears in the original patent but forms no part of this reissue specification; matter printed in italics indicates the additions made by reissue.

This invention relates to an improved extensible paper and to a process whereby such paper may be produced. More particularly, it relates to a novel patterned extensible kraft paper. The novel paper may be employed as a substitute for ordinary flat kraft, and it is especially well adapted for use as a bag material, particularly in multiwall bags. The process of the present invention may be carried out on already existing papermaking machines, but with modification and changes in operating conditions.

In the accompanying drawings.

Figure 1:
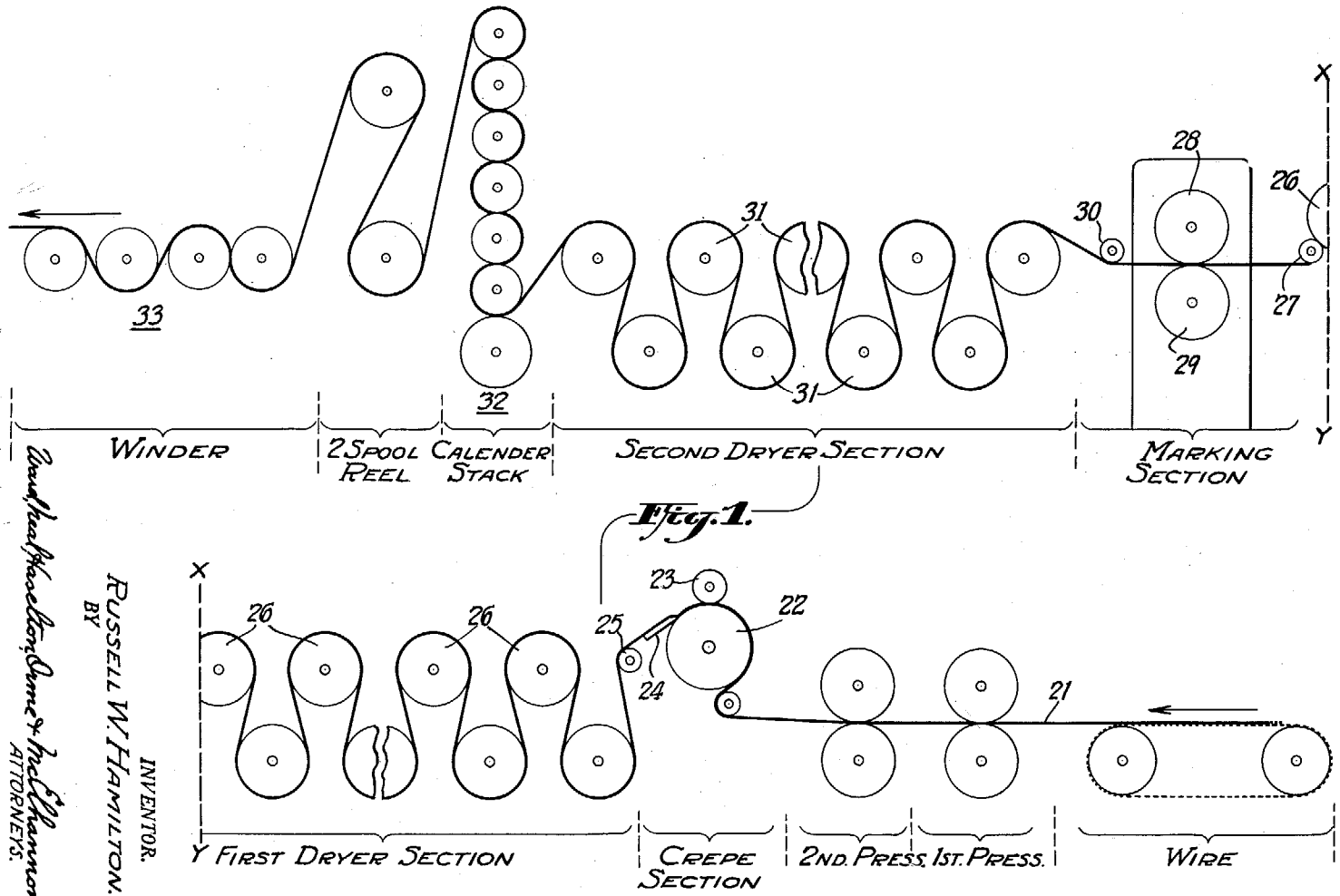
FIG. 1 is a schematic representation of *an example of* apparatus for carrying out the process of the present invention.

In recent years considerable research effort has been directed to improving the properties of conventional flat kraft paper in order to enable production of a bag, especially of the multiwall type, having a higher level of performance. One of the fruits of this research was the development of an extensible flat kraft paper, in particular the paper produced by the process of Cluett U.S. Patent No. 2,624,245. This paper has been found to be superior to ordinary kraft, particularly in multiwall bags. However, the process for producing extensible flat kraft is quite exacting, and a substantial capital expenditure is required for the apparatus employed to impart stretch to the paper web.

It is well-known that the simplest way to impart stretch to a paper is to crepe it. Thus, a web of finished kraft paper may be made stretchable or extensible simply by remoistening and doctoring the same from a creping cylinder. The web is then dried, and the resulting product is a creped kraft paper, known in the trade as off machine crepe. Alternatively, crepe may be imparted in a conventional manner during production of the kraft paper simply by training the moist web from the final press over a creping drier and removing the web with a doctor blade, and then drying in the usual manner, or by creping on the last drier (dry crepe). The off machine creping process is quite flexible in that a broad range of crepe, i.e. stretch, may be imparted to the paper. However, the products differ physically from one another, since in the dry and off machine processes the relationship of the fibers in an already dried web is disturbed. As a result, the tensile strength of dry crepe is substantially lower than that of conventional wet creped kraft of equivalent extensibility. It is thus preferable to impart crepe to the paper on the paper machine prior to final drying.

Extensible kraft paper creped in the conventional wet manner is superior to ordinary flat kraft, and has been employed as a bagging material, but without much success, due to the fact that such creped kraft, as well as dry crepes present a serious problem in the tubing and bag forming operations since the paper is so stretchable, i.e. the crepe is so easily pulled out. For example, in the high speed fabrication of multiwall bags the extreme difficulty of maintaining proper tube lengths with conventional crepe results in poor quality and very high scrap or rejects. Also, in a stepped end multiwall bag, the ply ends are staggered transversely of the direction of passage through the tuber and these ends must be precisely spaced. This perfect register and proper spacing is virtually impossible with conventional wet or dry crepe which are very easily stretched in the machine direction. Consequently it is not possible to form acceptable bags on the high speed tubers now employed.

It has been proposed to improve the stiffness of the creped kraft in the machine direction by embossing or marking the paper generally in the machine direction. Such marking sufficiently reduces machine direction stretch and improves the machine direction stiffness of the paper as to enable its use to a limited extent in the production of multiwall bags.

I have found that a vastly superior creped kraft paper, suitable for use on the highest speed tuber, can be produced by impressing a pattern upon a web having a critical moisture content following on machine creping, and then pulling out a substantial amount of the crepe while finally drying. In accordance with one aspect of the present invention the creped web is impressed so as to produce a pattern across one surface which consists of a plurality of substantially parallel spaced grooves which extend generally transversely of the creping wrinkles, and preferably normally of said wrinkles. This impressing or marking is essentially an embossing operation which is carried out by passing the web through the nip of a pair of rolls, one a steel marking or embossing roll having closely spaced grooves machined therein and the other a cotton filled backing roll having a built-up paper or relatively hard rubber surface. This marking greatly improves the stiffness of the web in the machine direction and increases the cross-machine stretch somewhat. The resulting paper performs eminently well on the tuber, and is superior to creped or embossed creped kraft papers in other respects, as pointed out hereinafter.

Figure 2:
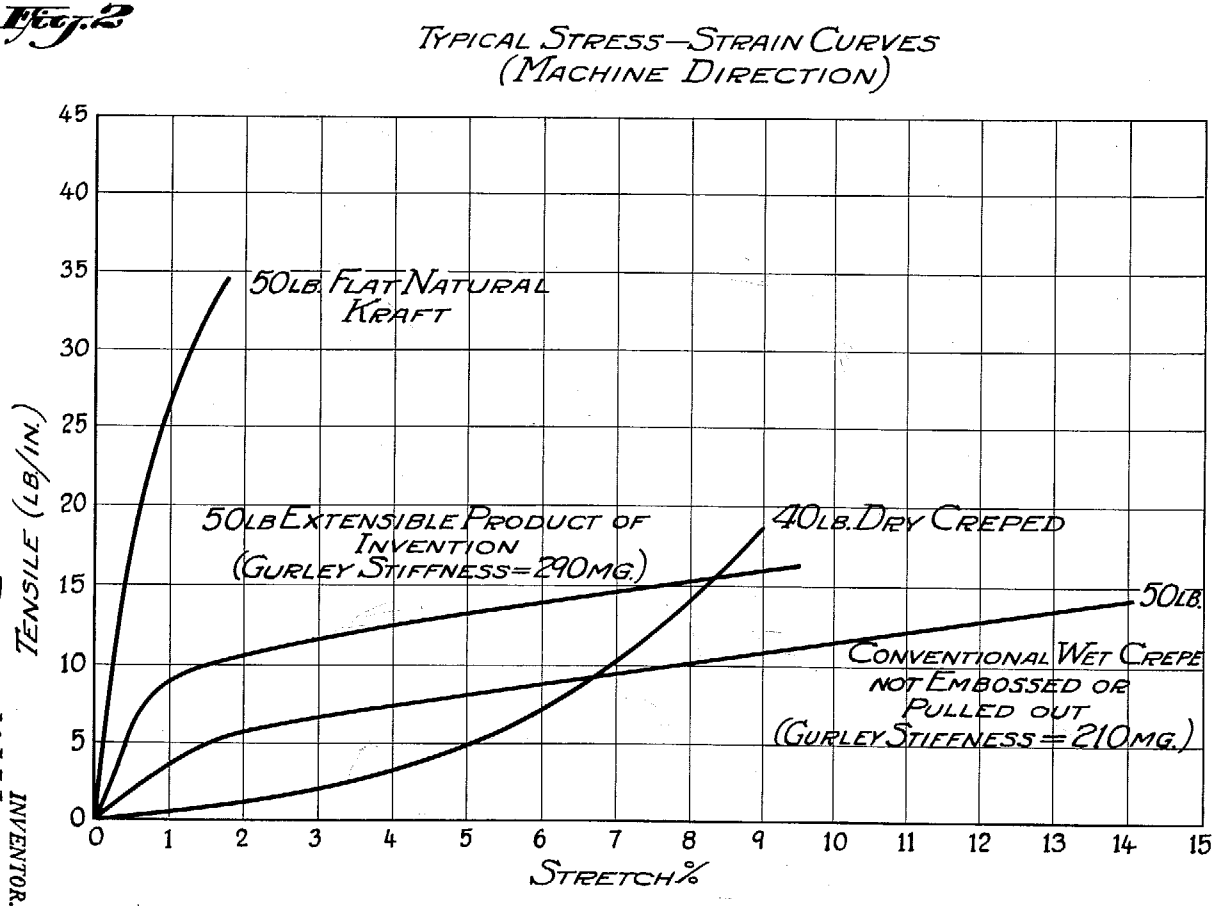
FIG. 2 is a typical stress-strain diagram for flat natural kraft, a dry crepe, conventional wet creped kraft and the extensible kraft paper product of the present invention.

Certain of the different characteristics of flat kraft, dry crepe, conventional wet crepe and the product of the present invention are immediately evident from the machine direction stress-strain diagram of FIG. 2. The flat natural kraft curve is very steep, and even at a stress of 34 pounds/inch the paper stretches less than 2%. The other papers are highly stretchable and not nearly so strong as flat kraft. Of the three stretchable papers, the product of the present invention is the stiffest in the machine direction and is superior to dry or conventional crepes. The area under each of the curves represents the work capacity of each of the papers.

The process of the present invention comprises [creping a moist paper web, preferably a web formed of natural shipping sack kraft stock, issuing from the last press of the papermaking machine, partially drying the creped web, then impressing the partially dried creped material with the aforementioned pattern, and then finally drying the creped marked web while simultaneously pulling out a substantial amount of the crepe initially imparted. The above steps are essential, but after] *forming kraft paper stock into a wet web, removing a portion of the moisture from the wet web, imparting crepe to the web from which a portion of the moisture has been removed, impressing the creped thus partially dried web having a critical moisture content as set forth below to produce a plurality of spaced compressed grooves which extend generally transversely of the creping wrinkles in the web, then intentionally pulling out a substantial amount of the crepe, that is to say about ¼ or more of the crepe imparted but retaining sufficient crepe in the web whereby the extensible paper retains in the machine direction a quite substantial resilient extension as hereinafter further explained, and drying the web. The aforesaid critical moisture content at the time the web is impressed or marked is as indicated hereinafter between about 30 and 55% by weight.* After final drying and pulling out the web may be calendered if desired prior to winding up.

The novel product of the present invention comprises an extensible creped kraft paper which is characterized by having an embossed or impressed pattern across one surface thereof, which pattern consists of a plurality of substantially parallel spaced grooves extending generally transversely of the crepe wrinkles in said web. Upon macroscopic examination of the paper product the creping wrinkles are substantially more compressed and substantially less apparent in the grooves of the pattern than on the lands or bosses therebetween. The novel paper is further characterized by having the crepe initially imparted thereto pulled out substantially, and by having an increased stiffness in the machine direction as compared with the machine direction stiffness of the same patterned creped kraft paper from which the crepe has not been pulled out substantially. The product is still further characterized by having a machine direction resilient extension, which will be defined hereinafter, equal to at least 0.8%, and preferably between 0.8 and 1.2%. On its reverse side the novel paper of the present invention also exhibits a groove pattern which is complementary to that on the impressed or embossed side, but the creping wrinkles are macroscopically substantially more apparent in the reverse side grooves than in the grooves on the impressed or embossed side of the paper.

As noted earlier, stretchable or extensible kraft paper is superior to natural ordinary flat kraft as a bagging material. This superiority is not as might be supposed the result of any increase in strength of the extensible kraft, since in reality the extensible papers have a substantially lower tensile strength than ordinary flat kraft. Any modification of the normal flat kraft web to impart extensibility to the resulting paper tends to weaken the natural bond between the fibers. Since the performance of a multiwall bag, for example, is substantially improved where the bag is constructed of extensible paper, it was thought that further improvement might be imparted by further increasing extensibility. However, this was found not to be the case. The very stretchable dry crepe does not perform as well as conventional wet creped kraft having a lower total extensibility. Also, tests indicated that a given paper having a relatively much higher total stretch did not perform as well as the same paper with less, but still appreciable, total stretch. It was thus manifestly clear that the performance of a multiwall bag is not directly related to the total extensibility of the paper from which it is made.

Proceeding on the assumption that the elastic component of the total extensibility of the paper was very likely the important factor in the improved performance of extensible kraft, a series of tests were carried out to determine the components of stretch as follows:

The average tensile (pounds per inch of width) and stretch (percent of total length) were determined for 10 test strips of paper. At a constant stretch value equal to 85% of the average stretch of the strips, it was found that the portion of the immediately recoverable extension, or resilient extension, of the paper was the same as would be obtained at a point nearer the rupture point of the strip with less danger of the strip rupturing during subsequent tests, and accordingly a figure of 85% was employed.

In the tests, samples of equivalent length were extended at a constant rate equal to ½ inch per minute to the predetermined 85% stretch value. The crosshead of the stretching apparatus was stopped at this point and held stationary for a period of five minutes in order to isolate resilient extension from delayed elastic extension. At the end of five minutes the crosshead was returned to its original position. The slack in the sample strip represented the portion of stretch which is not recovered immediately by the paper. The difference between this and the 85% stretch value is the resilient extension. The strip was then allowed to rest or relax for a period of thirty minutes after which it was extended to rupture. Following rupture there was still some slack in the strip, which slack is equal to the plastic extension of the paper. Delayed extension can be obtained in either of two ways: (1) as the difference between the amount of slack in the strip after the load was released and the amount present after the thirty minute rest, or (2) as the difference between the 85% extension value and the sum of the resilient and plastic extensions.

Summarizing this test: If a strip of paper is extended at a constant rate of extension to a predetermined extension and then held at that extension for a period of time, it is found that upon release of the load the strip will immediately recover a portion of the stretch originally imparted to it. If the strip is then allowed to rest or relax for a further period of time, it will recover an additional amount. At this time there is still a portion of slack in the sheet, which is a measure of the nonrecoverable part of the stretch. The following terms are used to identify the three components of total stretch:

"Resilient extension"—that part of the stretch which is recovered immediately upon release of the load.

"Delayed elastic extension"—that part of the stretch which is recovered after the strip has been allowed to rest or relax for a period of time.

"Plastic extension"—that part of the stretch which is never recovered.

Each of the above components is measured as a percent of the total length of the sample under examination. The tests were carried out and measurements made under controlled conditions of temperature and relative humidity, namely, at 73° F.±3.5° and 50% RH±2%. The components of extensibility as well as tensile strength and other properties of paper vary with temperature and relative humidity, and throughout this application it is to be understood that the figures for resilient extension, stiffness, etc., are as determined at the above conditions.

While the final test for any filled, closed multiwall bag is of course its ability to stand up under the rigors of transportation, handling, etc., certain tests can be carried out in the laboratory on the filled bag which will give an excellent indication of the bag's serviceability. The laboratory test which most nearly correlates with the actual field performance of multiwall bags has been found to be the elevator flat drop test. This test consists of first filling the bag in the usual manner with livestock feed, fertilizer, dry chemicals, cement, seeds, or the particular material which is to be contained, and then dropping the closed bag flat on its face from a height of 24 inches, then increasing the height in 6 inch increments and turning the bag over for each successive drop until the bag fails. The maximum height is 9 feet. If a bag reaches this height, it is dropped repeatedly from 9 feet until failure occurs. In either event, the total number of drops required to break the bag is averaged for the number of bags tested. This test is carried out at the aforementioned conditions of controlled humidity and temperature.

Upon analysis of the results of the extensibility and elevator flat drop tests an excellent correlation was found to exist between the product of machine direction resilient extension and total basis weight of the paper plies and the number of elevator flat drops which the multiwall bag would withstand without rupturing. (Basis weight is the weight in pounds of 500 sheets 24 x 36 inches. For example, the basis weight of kraft paper may be 50 pounds, but the basis weight of such material employed in a three-ply multiwall bag would be 150 pounds.)

No correlation was found to exist between elevator flat drops and delayed elastic extension in either the machine (MD) or cross-machine (CD) direction of the paper, nor between the number of drops and the CD resilient extension. Furthermore, the conventional measurements usually made on paper, such as tensile, tear, work and total stretch did not correlate with drop test results on either the [produce] *product* of the present invention, dry crepe, conventional wet creped or flat natural kraft papers.

In the following table the performance of three exceptionally high quality flat natural kraft papers and a dry crepe are compared with two typical examples of the present novel extensible creped kraft paper.

TABLE I

| Paper | MD Resilient Extension (percent) | MD Tensile, lbs./in. | Elevator Flat Drops (Sewn 3-ply bags | Total Basis Weight (lbs.) | Basis Weight XMD Resilient Extension |
|---|---|---|---|---|---|
| Flat Kraft: | | | | | |
| 1 | 0.69 | 29.3 | 9 | 150 | 103.5 |
| 2 | 0.72 | 34.3 | 8.4 | 150 | 108 |
| 3 | 0.74 | 36.0 | 8 | 150 | 111 |
| Dry Crepe | 0.71 | 15.9 | 3.8 | 135 | 95.8 |
| Extensible Creped Kraft of Present Invention: | | | | | |
| A | 0.92 | 20.4 | 11.2 | 150 | 138 |
| B | 0.98 | 15.4 | 10.9 | 150 | 147 |

The figures in Table I represent the average of several tests with each paper, and the greatly improved performance in the drop test and higher MD resilient extension of the product of the present invention over flat kraft and dry crepe is readily apparent. Flat kraft paper of the highest quality always has a resilient extension below about 0.8% and the three samples are indicative of the performance of exceptionally high quality kraft. The product of the present invention has a resilient extension above 0.8%, and generally between 0.9 and 1.1%.

In order to impart the requisite machine direction resilient extension to the paper, it is necessary to increase its total machine direction stretch by the creping operation. But it has been found that for a given rate of increase in the total machine direction stretch the resilient extension increases at a lower rate. Furthermore, with an increase in the total stretch the tensile strength of the product tends to go down. Accordingly, the desired minimum resilient extension should be obtained without imparting an unnecessarily high degree of total stretch to the final product. In this connection it has been found that once the necessary machine direction resilient extension has been imparted to the web, the web can be pulled out (i.e. stretched permanently) appreciably during manufacture of the product without any appreciable reduction in the desired resilient properties. In fact, MD resilient extension can be increased by proper creping and pulling out. Accordingly, in the process of the present invention a high degree of crepe is imparted to the moist web (high total stretch) the web is marked, and then dried while simultaneously the crepe is pulled out substantially.

The terms "pulled out substantially" and "substantially pulled out" as employed herein mean that a portion of the crepe initially imparted to the web is intentionally pulled out in the process, e.g. during final drying. In any continuous processing, for example drying, of a moist creped paper web some of the crepe is unavoidably pulled out due to the fact that some tension must be applied to the web to draw it through the apparatus. "Pulled out substantially" thus indicates a greater tension, resulting in a greater pull out of the crepe, than would normally be applied to the web simply to enable proper continuous drying or other processing. In the present process between about ¼ and ½, preferably about ⅓, of the crepe is pulled out.

While the primary purpose of the marking or embossing operation is to improve the MD stiffness of the resulting sheet, pulling out the crepe substantially following marking of the web still further improves the stiffness of the product. While the embossing treatment reduces the total stretch imparted to the web by creping, it does not seriously affect the MD resilient extension of the sheet, nor does it seriously impair the CD resilient extension of the paper. As has been shown, MD and not CD resilient extension is the important factor in the performance of a multiwall bag made from the product of the present invention. However, in the present product the resilient extension in the cross machine direction is comparable or just slightly lower than in the machine direction. In the optimum product resilient extension will be substantially the same in both directions.

Referring now to *a preferred example contemplated for carrying out* the process of the present invention [in more detail] with specific reference to FIG. 1, the wet web 21 issuing from the wire of the papermaking machine has the excess moisture removed therefrom in a conventional manner as by a first and second set of press rolls. As the web leaves the second press, it has a moisture content between about 60 and 75%, preferably about 65%. It is then directed over a creping dryer roll 22 which operates at a temperature of about 150° F. Proper adherence to the dryer is assured by the top rubber coated roll 23. The web is then scraped from the dryer by a doctor blade 24 in the usual manner which imparts the crepe. The creped web then passes over a spreading roll 25, having worm markings, which leads the web from the doctor without longitudinal wrinkles to a series of heated driven drying roll 26, which compris the first dryer section. In this section the moisture of the web is reduced to about 30–55%, preferably to about 40–50%. Proper moisture content at this point is essential to proper impression of the pattern, and while correct moisture content will depend upon the particular furnish, it will generally be between about 40 and 50%. In a high speed machine a felt may be necessary over the first few drying rolls to assure proper positioning of the web during the first stages of initial drying.

The partially dried creped web then passes in contact with a floating spring guide roller 27 and thence into the nip of the marking rollers, which comprise a driven embossing roll 28 and a paper or rubber coated *or* cotton filled bottom backup roll 29. Means are provided for nip pressure adjustment in the marking section. The surface of the roll is marked with a plurality of parallel grooves corresponding to the surface of the embossing roll 28, which has approximately 15 to 25 parallel, preferably circumferential, grooves per inch, approximately 1/64 inch deep.

Since the web is prone to contract somewhat in the direction of its width due to the action of the marking section, a spreading roll 30, similar to roll 25, is provided intermediate the marking section and the first roll of the second dryer section in order to prevent longitudinal creasing.

The creped, marked, partially dried web is then finally dried in contact with a plurality of driven heated dryer rolls 31, which constitute the second dryer section. The rolls 31 of the second dryer section are operated at a linear speed substantially higher than the speed of the rolls of the marking section and the first dryer section in order to pull out a substantial amount of the crepe initially imparted to the web. More particularly, the speed of the second dryer section is so regulated as to pull out at least ¼ of the crepe. From FIG. 1 it can be seen that when the second dryer section is operated at constant speed this pullout occurs between the first roll of the second dryer section and the marking section.

Following pulling out and drying, the paper web may be calendered in a conventional manner as by the calender stack 32 and subsequently wound up as at 33. It has been found that the desirable properties which are imparted to the paper by the process of the present invention are not adversely affected by calendering.

As noted earlier, to impart the necessary machine direction resilient extension to the web it is necessary to impart total stretch thereto by creping. The extent or degree of such creping in the arrangement of FIG. 1 is the difference in linear speed between the creping dryer (which operates at substantially the same speed as the second press) and the first dryer section. For example, at a creping dryer speed of 258 feet per minute and a first dryer section speed of 220 feet per minute, the crepe imparted to the web is 38 feet per minute, or more aptly approximately 15%. Now in any creping, whether or not the web is subsequently embossed, the efficiency of the operation is lower, or in other words the machine cost per unit length of creped paper produced is substantially higher than in the production of flat paper by reason of the dryer slowdown required for creping. This slowdown is the net difference in linear speed between the second press of the papermaking machine and the last dryer section. For example, in the production of a creped, marked paper in the case just mentioned assuming the second press is operating at a speed of about 256 feet per minute and the second dryer section at about 222 feet per minute, the net slowdown of the machine is approximately 34 feet per minute, or about 13%. The difference between the crepe imparted and the net slowdown, which is equal to roughly 2% in the case illustrated, is a result of shrinkage normally incurred in the drying process.

In accordance with the present invention it has been found that a superior sheet of paper can be formed if a substantial amount of the crepe imparted to the web is pulled out. Not only is the sheet superior from a stiffness standpoint, but the MD resilient extension is improved and machine costs are reduced since the second dryer section operates at higher speed. Apparently a portion of the non-resilient extensions are removed from the paper during this pull out. Pull out may be defined as the difference in linear speed between the marking section and the last dryer section. With the first dyer section operating at 220 feet per minute, as above, and the embossing or marking roll at about 222 feet per minute, in order to maintain proper tension in the web, the last dryer section may in accordance with the present invention operate at 235 feet per minute, for a net pull out of 13 feet per minute, or about 6%.

Several series of production runs have been carried out on conventional papermaking equipment, modified as above described, to determine the effects of varying sectional speed differentials on the physical properties of the embossed extensible creped kraft paper product. During these production trials pneumatic loading on the embossing roll was varied from 0 to 25 p.s.i.g. and it was found that best papers were produced between 0 p.s.i.g. (dead weight loading) and 5 p.s.i.g., which correspond generally to a load of about 40 pounds to 60 pounds per linear inch of the web. Cross machine direction stretch showed a tendency to decrease at increased amounts of embossing roll pressure and the highest cross machine direction tensile-energy (work) occurred at conditions of dead weight loading.

The furnish to the papermaking machine was a high quality unbleached shipping sack kraft pulp to which was added per ton of pulp:

16 lbs. dark size
26½ lbs. tapioca starch
10½ lbs. Lycoid OPMC
26½ lbs. Alum
2.6 lbs. Keraton
5.2 lbs. Lukon Wax 11946
29 lbs. sodium silicate The pH at the beaters was 4.7, at the jordan 6.3 and in the tray 6.7. The head box Schopper-Riegler 2 gram freeness varied from 640 cc. to 700 cc. and the consistency of the pulp was between 2.7 and 2.9%. The web moisture at the creping dryer was about 68% and at the embossing roll varied from about 44 to 48%.

The following table indicates the sectional speed conditions of the runs in feet per minute, which conditions were calculated from the results of previous tests to produce a hexagonal pattern of machine direction resilient extension on a surface response diagram.

TABLE II

| Sectional Speed Condition | Creping Dryer | 1st Dryer Section | Duo-Roll | 2nd Dryer Section |
|---|---|---|---|---|
| A | 258 | 218 | 220 | 228 |
| B | 258 | 223 | 225 | 228 |
| C | 258 | 222 | 225 | 237 |
| D | 258 | 228 | 230 | 236 |
| E | 259 | 233 | 235 | 237 |
| F | 259 | 234 | 235 | 248 |
| G | 259 | 238.5 | 240 | 249 |

The following table reports the resilient extension work, total stretch, Gurley stiffness and basis weight of the paper produced at each of sectional speed conditions A through G. The figures reported in the table were determined on samples cut from the center of the web produced with a marking roll pneumatic pressure of 5 p.s.i.g. (55 pounds per inch of web width).

TABLE III

| Sectional Speed Condition | Resilient Extension, Percent | | Tensile Energy or Work (ft.-lb./ft.²) | | Stretch Percent | | Gurley Stiffness (mg.) | Basis Weight |
|---|---|---|---|---|---|---|---|---|
| | MD | CD | CD | MD+CD | MD | CD | MD | |
| A | 0.992 | 0.798 | 5.60 | 21.06 | 12.30 | 4.80 | 210 | 49.8 |
| B | 0.940 | 0.794 | 5.70 | 20.09 | 10.56 | 4.42 | 210 | 49.4 |
| C | 0.958 | 0.790 | 5.00 | 18.13 | 8.48 | 4.26 | 320 | 50.1 |
| D | 0.900 | 0.808 | 4.83 | 16.84 | 8.60 | 4.34 | 300 | 48.3 |
| E | 0.858 | 0.730 | 4.89 | 17.31 | 7.38 | 4.00 | 270 | 48.9 |
| F | 0.728 | 0.748 | 4.01 | 10.59 | 3.64 | 3.54 | 290 | 47.1 |
| G | 0.728 | 0.796 | 4.74 | 11.07 | 3.42 | 3.80 | 270 | 46.9 |

Figure 3:
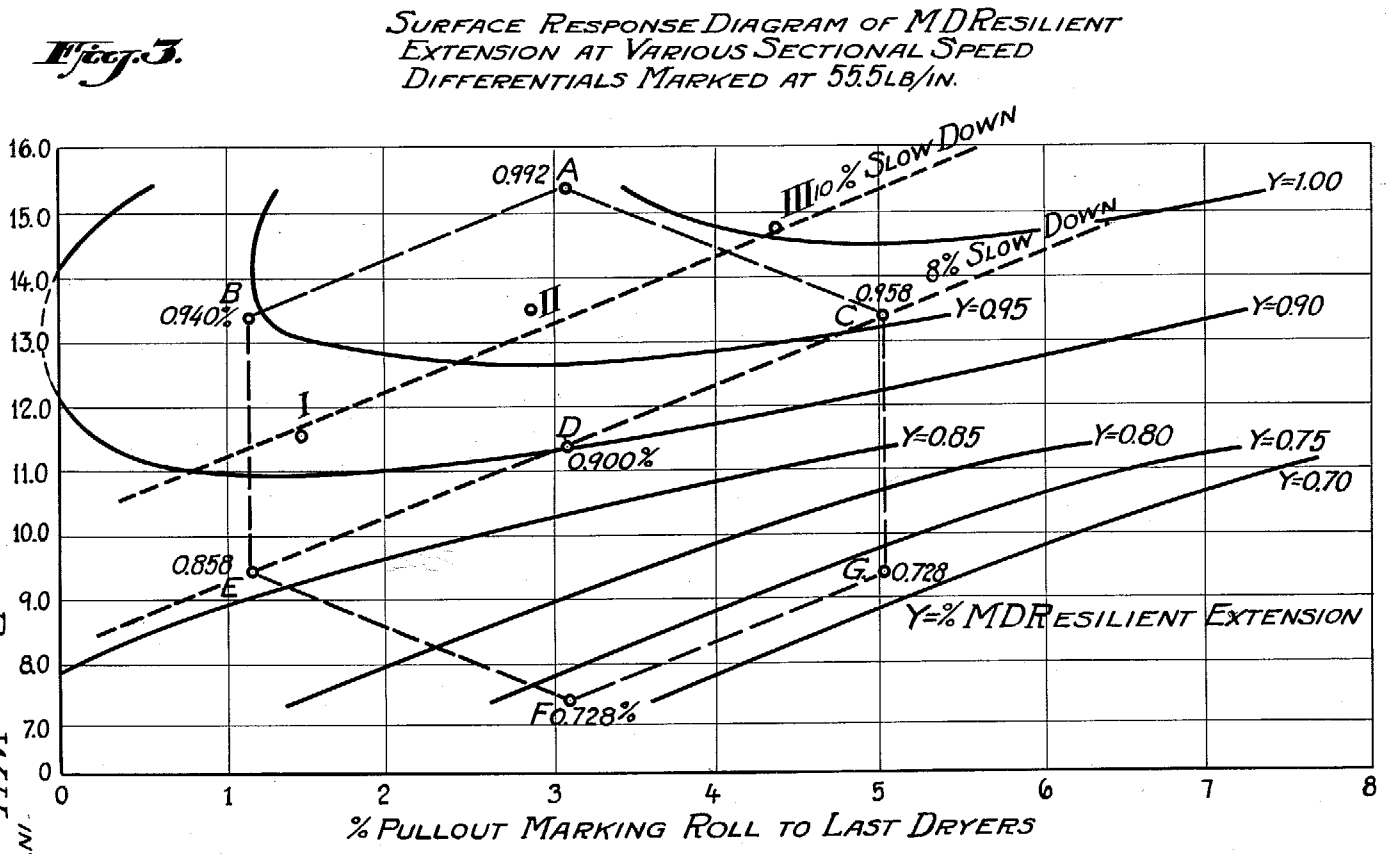
FIG. 3 is a typical surface response diagram of machine direction resilient extension of paper produced by the process of the present invention at various sectional speed differentials.

Reference will now be had to FIG. 3 which is a three-dimensional surface response diagram of machine direction resilient extension at the various speed differentials.

Percent crepe is plotted against percent pull out, and the resilient extension at conditions A, B, C, E, F, G have been plotted. Condition D, equal to a resilient extension of 0.90% falls in the center of the hexagon. The dotted diagonal lines indicate 8% and 10% machine slowdown. From the resilient extension values plotted, it was possible to draw contour lines corresponding to MD resilient extensions from 0.70% to 1.0%. It can be seen that a sheet having a resilient extension of 0.95% can be produced by imparting a crepe of 13.5% and without substantially pulling out the crepe. Such condition approximates point B. It is seen that approximately 1% pull out has been effected, but this is unintentional and is simply the result of maintaining sufficient tension on the web to enable proper operation of the marking and second dryer sections. Accordingly, where a condition of no pull out is mentioned herein it is assumed that in reality the creped web may have been pulled out the necessary 1 or 1½%. The paper produced at point B has a total stretch of about 10.6%, but from Table II it is seen that the slowdown of the machine necessary to produce paper B is 11.6%, and the resulting paper has a Gurley stiffness of only 210 mg.

Referring now to point C, it is seen that a paper having a resilient extension in the machine direction of approximately the same value, 0.95%, can be produced by first imparting 13.5% crepe and subsequently pulling out about 5%, or in other words reducing the crepe by the factor of 13.5:5. At sectional speed differentials corresponding to point C, the slowdown of the machine is about 8%. While paper C has a total stretch of 8.5%, it would be expected to be equivalent for bags to paper B which has a stretch of 10.6%. Lower machine slowdown enables the production of a greater yardage of paper C than paper B per given time.

While production economies are of course desirable, substantially more is involved than a simple speed-up of the operation since it is apparent from Table III that the stiffness of paper C (320 mg.) is substantially greater than that of paper B. Points C, D and E all fall on the 8% slowdown line. At condition E 9.5% crepe was imparted with no pull out, while at condition D 11.5% crepe was imparted with 3% pull out and at condition C 13.5% crepe and 5% pull out. It is thus manifestly clear that the more crepe imparted to the web and the higher the pull out, the higher the resilient tension and the Gurley stiffness of the resulting paper.

Points I, II and III of FIG. 3 are the results of tests conducted at a machine slowdown of 10%. It is clear that paper III is the best with respect to resilient extension in the machine direction, yet all three papers had substantially the same total stretch. The test was carried out at dead weight loading on the embossing roll, and the stretch and Gurley stiffness are reported in the following table.

TABLE IV

| Paper | Crepe (Percent) | Pull Out (Percent) | Stretch (Percent) | Gurley Stiffness (mg.) |
|---|---|---|---|---|
| I | 11.6 | 1.5 | 7.8 | 213 |
| II | 13.6 | 2.8 | 7.8 | 237 |
| III | 14.7 | 4.3 | 7.7 | 317 |

Paper III had a Gurley stiffness appreciably higher than either of papers I or II.

Finally, from FIG. 3 it can be seen that a superior product in accordance with the present invention can be produced by operating in the vicinity of point C and directly above this point, that is on or above the machine direction resilient extension 1% contour line. Optimum properties are achieved by running a high percent crepe with maximum pull out after embossing. A preferred product in accordance with the present invention has a machine direction total stretch of about 9% and is produced by imparting about 13.5–15% crepe and pulling out this crepe to the extent of about 4.5–6%.

Figure 4:
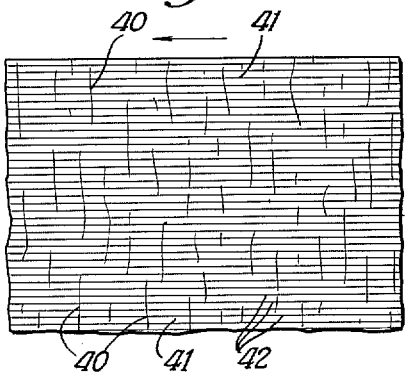
FIGS. 4–7 illustrate several typical embossed or impressed surface patterns in the paper product of this invention.
Figure 5:
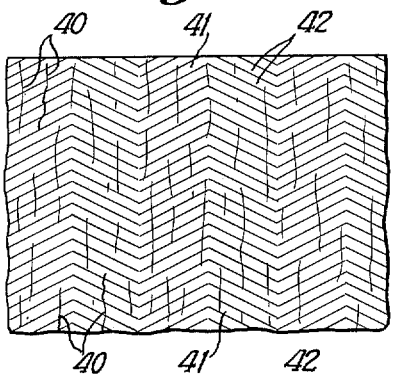
Figure 6:
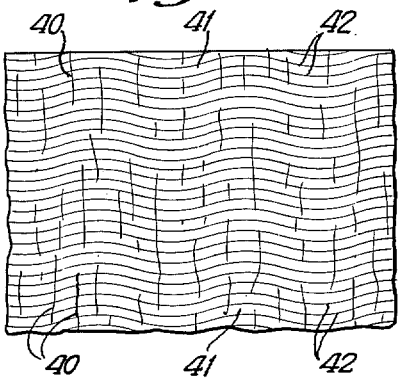
Figure 7:
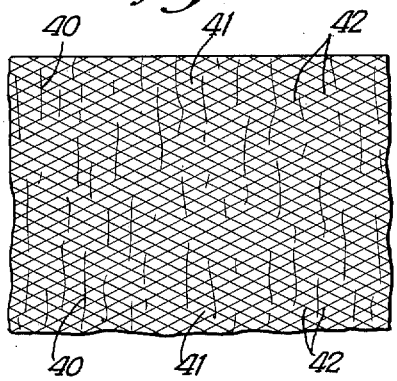

While the product of the present invention is essentially an embossed paper, it is referred to herein as a paper having a pattern impressed in one surface. A preferred form of pattern is that illustrated in FIG. 4. The creping wrinkles in the sheet are indicated at 40 and the grooves of the pattern which extend transversely of the creping wrinkles are illustrated for convenience as the fine lines 41, which are parallel to one another and spaced apart by lands or bosses 42. While a wide variety of patterns may be impressed in the surface of the creped, partly dried web, in each case the grooves will be parallel to one another, or substantially so, and will be impressed upon the paper in a direction which is generally transverse of the creping wrinkles therein. Three typical patterns are illustrated in FIGS. 5–7, wherein the reference numerals indicate the portions of the sheet described in connection with FIG. 4.

To the unaided eye the creping wrinkles are much more apparent on the lands or bosses than in the grooves of the pattern. In fact, the sheet does not give the impression of having been embossed, but rather it appears that the grooves have been impressed in the sheet, that is that the thickness of the paper is reduced in the grooves, and this may be the case to a very limited extent. However, the surface of the sheet is characterized by the fact that the creping wrinkles are not nearly so apparent in the grooves as on the lands, and the grooves are sufficiently close to one another that the creping wrinkles are definitely interrupted. The grooves in a preferred product are approximately ⅓ the width of the lands or bosses.

On the reverse side of the sheet the grooves are complementary to the lands on the upper surface. The creping wrinkles are readily apparent and appear much more pronounced than on the upper or marked surface. Furthermore, they do not appear to be interrupted, and the wrinkles can be easily seen in the grooves.

Figure 9:
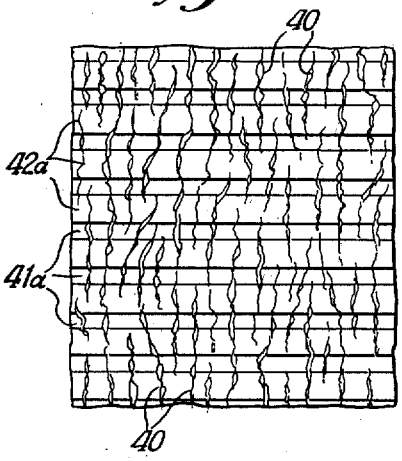
FIG. 9 is a similar enlarged view of the reverse side of the paper of FIG. 4.
Figure 8:
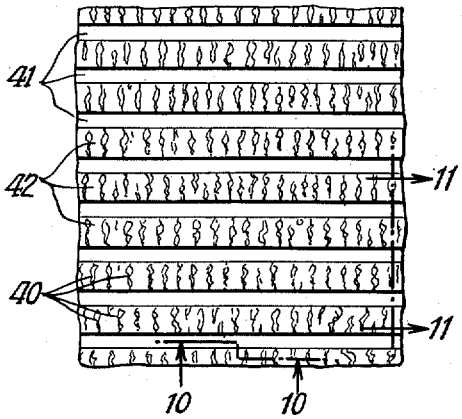
FIG. 8 is a greatly enlarged view of a portion of the surface of the paper of FIG. 4.

An attempt has been made in FIGS. 8–11 to illustrate the upper and the lower surface of the product of the present invention as it would appear to the unaided eye. Within the limits of a patent drawing it has been necessary to greatly enlarge the paper illustrated in FIG. 4 to accomplish this purpose. Referring to FIG. 8, on the marked side of the paper the creping wrinkles 40 can readily be seen on the bosses or lands 42 intermediate grooves 41, and these wrinkles are substantially invisible in the grooves. In FIG. 9, showing the reverse side, the lands are identified as 41a and correspond to the grooves 41 of FIG. 8, while the grooves are identified as 42a and correspond to lands 42 of FIG. 8. Creping wrinkles 40 are readily apparent across the entire surface of the reverse side, and particularly they are easily evident in grooves 41a as compared with their evidence in grooves 41 on the marked surface of paper.

Figure 10:
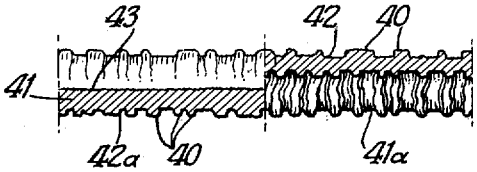
FIG. 10 is a sectional elevation through the paper taken on the line 10—10 of FIG. 8.
Figure 11:
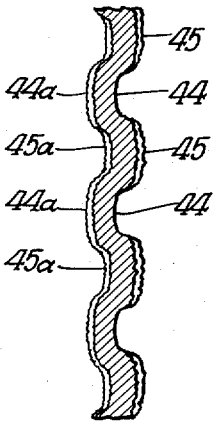
FIG. 11 is a right sectional elevation with respect to FIG. 10 taken on the line 11—11 of FIG. 8.

In the still further enlarged section of FIG. 10, the very slight evidence of the creping wrinkles is illustrated as the rough line 43 on the upper surface of groove 41. On the reverse side 42a the creping wrinkles 40 are readily apparent. On the upper surface of the sheet the creping wrinkles 40 on the lands 42 are quite evident, as they are on the reverse side 41a. In FIG. 11, the upper surface of the grooves is smooth as shown at 44, as compared with the upper surface of the lands illustrated at 45. On the reverse side of the sheet, the creping wrinkles are apparent on the lands 44a and in the grooves 45a.

No difficulties have been encountered in printing the embossed surface of the product. In fact, the irregularities in the surface are highly advantageous since they impart non-skid qualities to the paper without resort to chemical treatment. By virtue of the embossed surface the paper bags made therefrom are more easily grasped and the stacking properties of the bags are greatly improved.

While the present invention is directed primarily to the use of conventional natural shipping sack kraft as the starting pulp, and the values for machine direction resilient extension, Gurley stiffness, moisture at various stages of the process are based upon such a starting material, it is obvious that a still further improved extensible paper may be prepared by modification of the starting pulp, for example by the incorporation of a resin such as melamine-formaldehyde precondensate therewith. Such modification is within the contemplation of this invention.

I claim:

1. A process for producing an extensible kraft paper which comprises forming kraft stock into a wet web, pressing excess moisture therefrom, imparting crepe to the pressed moist web, partially drying the creped web, impressing the creped partly dried web to produce a pattern on a surface thereof consisting of a plurality of spaced compressed grooves which extend generally transversely of the creping wrinkles in the web, then pulling out a substantial amount of the crepe and drying the web.

2. A process as set forth in claim 1 wherein the pressure with which the pattern is impressed upon the web is such that upon macroscopic examination of said surface of the web the creping wrinkles are substantially less apparent in the grooves than on the spaces therebetween.

3. A process as set forth in claim 1 wherein between about ¼ and ½ of the crepe is pulled out of the web.

4. A process for producing an extensible kraft paper which comprises forming kraft stock into a wet web, removing a portion of the moisture therefrom, imparting between about 8.5 and 15% crepe to the thus partially dried web, impressing the creped partly dried web at a moisture content between about 30 and 55% to produce a pattern on a surface thereof consisting of a plurality of spaced compressed grooves which extend generally transversely of the creping wrinkles in the web and pulling out between about ¼ and ½ of the crepe while further drying the web.

5. A process for producing an extensible kraft paper which comprises forming kraft stock into a wet web, pressing excess moisture therefrom to a moisture content of between about 60 and 75%, creping the pressed moist web, drying the creped web to a moisture content of between about 30 and 55%, impressing the creped partly dried web to produce a pattern on a surface thereof consisting of a plurality of spaced compressed grooves substantially parallel to one another which extend generally transversely of the creping wrinkles in the web, then pulling out between about ¼ and ½ of the crepe and drying the web.

6. A process as set forth in claim 5 wherein following creping the web is dried to a moisture content of about 40 to 50%.

7. A process for producing an extensible kraft paper which comprises forming kraft stock into a wet web, pressing excess moisture therefrom to a moisture content of between about 60 and 75%, imparting between about 8.5 and 15% crepe to the pressed moist web, drying the creped web to a moisture content of between about 30 and 55%, impressing the creped partly dried web to produce a pattern on a surface thereof consisting of a plurality of spaced compressed grooves substantially parallel to one another which extend generally transversely of the creping wrinkles in the web and then pulling out between about ¼ and ½ of the crepe and drying the web.

8. A process as set forth in claim 7 wherein the creped web is impressed with a loading of between about 40 and 60 pounds per inch of web width.

9. A process for producing an extensible kraft paper which comprises forming kraft stock into a wet web, removing a portion of the moisture from the wet web, imparting between about 8.5 and 15% crepe to the thus partially dried web, impressing the creped partially dried web at a moisture content of between about 30 and 55% to produce a plurality of spaced compressed grooves which extend generally transversely of the creping wrinkles in the web, pulling out between about ¼ and ½ of the crepe imparted to the web, and drying the web.

10. A process for producing an extensible kraft paper which comprises forming kraft stock into a wet web, removing a portion of the moisture from the wet web, imparting crepe to the thus partially dried web, impressing the creped partially dried web to produce a plurality of spaced compressed grooves which extend generally transversely of the creping wrinkles in the web, pulling out between about ¼ and ½ of the crepe imparted to the web and drying the web.

11. An extensible, embossed creped kraft paper product produced by the process of claim 10.

*12. A process for producing an extensible kraft paper which comprises forming kraft stock into a wet web, removing a portion of the moisture from the wet web, imparting crepe to the thus partially dried web, impressing the creped partially dried web to produce a plurality of spaced compressed grooves which extend generally transversely of the creping wrinkles in the web, pulling out at least ¼ of the crepe imparted to the web but retaining sufficient crepe in the web whereby the extensible paper retains a machine direction resilient extension of at least 0.8%, and drying the web.*

References Cited in the file of this patent or the original patent

UNITED STATES PATENTS

| | | |
|---|---|---|
| 790,023 | Arkell | May 16, 1905 |
| 1,119,816 | Fogarty | Dec. 8, 1914 |
| 1,946,838 | Cofrin | Feb. 13, 1934 |
| 1,958,750 | Graham | May 15, 1934 |
| 2,043,351 | Fourness et al. | June 9, 1936 |
| 2,168,895 | Ashes | Aug. 8, 1939 |
| 2,874,618 | Yang | Feb. 24, 1959 |

FOREIGN PATENTS

| | | |
|---|---|---|
| 26,068 | Great Britain | Apr. 30, 1908 |